(12) United States Patent
Jensen et al.

(10) Patent No.: US 9,133,816 B2
(45) Date of Patent: Sep. 15, 2015

(54) FLOW GUIDING DEVICE WITH BASE HAVING RECESS FOR ADHESIVE STRIP OR TAPE

(75) Inventors: Lars Erik Jensen, Hedensted (DK); Hans Tommerup Knudsen, Grenå (DK); Jesper Madsen, Gesten (DK)

(73) Assignee: LM Windpower A/S, Kolding (DK)

( * ) Notice: Subject to any disclaimer, the term of this patent is extended or adjusted under 35 U.S.C. 154(b) by 693 days.

(21) Appl. No.: 13/365,545

(22) Filed: Feb. 3, 2012
(Under 37 CFR 1.47)

(65) Prior Publication Data
US 2012/0257979 A1    Oct. 11, 2012

(30) Foreign Application Priority Data

Feb. 4, 2011  (EP) ..................................... 11153352

(51) Int. Cl.
| | | |
|---|---|---|
| F03D 11/00 | (2006.01) | |
| F03D 1/06 | (2006.01) | |
| B64C 3/14 | (2006.01) | |
| B64C 11/18 | (2006.01) | |
| B64C 11/20 | (2006.01) | |

(Continued)

(52) U.S. Cl.
CPC ............ *F03D 1/0608* (2013.01); *F03D 1/0675* (2013.01); *B64C 11/18* (2013.01); *B64C 11/20* (2013.01); *B64C 27/467* (2013.01); *B64C 27/473* (2013.01); *B64C 2003/148* (2013.01); *F05B 2240/122* (2013.01); *F05B 2240/30* (2013.01); *Y02E 10/721* (2013.01); *Y10T 29/49318* (2015.01); *Y10T 137/2087* (2015.04)

(58) Field of Classification Search
CPC . F03D 1/0675; B64C 2003/148; B64C 11/18; B64C 11/20; B64C 27/467; B64C 27/473
USPC .............................. 416/62, 146 R, 235, 236 R
See application file for complete search history.

(56) References Cited

U.S. PATENT DOCUMENTS

| | | | | |
|---|---|---|---|---|
| 7,448,764 B2 * | 11/2008 | Platzer, Jr. | .................... | 359/864 |
| 7,927,070 B2 * | 4/2011 | Godsk et al. | .................... | 416/62 |
| 7,927,078 B2 * | 4/2011 | Parsania et al. | ............... | 416/235 |

(Continued)

FOREIGN PATENT DOCUMENTS

| | | |
|---|---|---|
| DE | 10 2007 043297 A1 | 3/2009 |
| WO | 00/15961 A1 | 3/2000 |

(Continued)

OTHER PUBLICATIONS

Extended European Search Report for corresponding EP Application No. 11153352.7, dated Jun. 30, 2011, five (5) pages.

*Primary Examiner* — Ninh H Nguyen
(74) *Attorney, Agent, or Firm* — Nath, Goldberg & Meyer; Jerald L. Meyer; Tanya E. Harkins (57) ABSTRACT

A vortex generator device (70) for mounting on a wind turbine blade (10) is disclosed. The device comprises: a base (71) having, when mounted on an exterior of the wind turbine blade (10), an inner side (72) for attaching on a surface, such as the exterior of the wind turbine blade (10), and an outer side (73) facing away from the exterior of the wind turbine blade (10). The device is provided with a vane vortex generator pair comprising a first vane (79) and a second vane (80) protruding from the outer side (73) of the base (71). The inner side (72) of the base (71) is provided with a recess (74) or undercut for obtaining an adhesive (81).

15 Claims, 7 Drawing Sheets

(51) Int. Cl.
*B64C 27/467* (2006.01)
*B64C 27/473* (2006.01)

(56) References Cited

U.S. PATENT DOCUMENTS 8,047,801 B2 * 11/2011 Fang et al. .................... 416/235
8,203,786 B2 * 6/2012 Hine ............................. 359/457
8,746,053 B2 * 6/2014 Brake et al. .................... 73/147

FOREIGN PATENT DOCUMENTS

| WO | 02/08600 A1 | 1/2002 |
| WO | 2006/122547 A1 | 11/2006 |
| WO | 2007/140771 A1 | 12/2007 |
| WO | 2008/113350 A2 | 9/2008 |

\* cited by examiner

FLOW GUIDING DEVICE WITH BASE HAVING RECESS FOR ADHESIVE STRIP OR TAPE

This is a Non-Provisional Application claiming the benefit under 35 U.S.C. §119 of European Application No. 11153352.7, filed on Feb. 4, 2011, the content of which is hereby incorporated by reference in its entirety.

The present invention relates to a vortex generator device for mounting on a wind turbine blade comprising a base having, when mounted on an exterior of the wind turbine blade, an inner side for attaching on a surface, such as the exterior of the wind turbine blade, and an outer side facing away from the exterior of the wind turbine blade, the device being provided with a vane vortex generator pair comprising a first vane and a second vane protruding from the outer side of the base. The invention further relates to a wind turbine blade provided with such vortex generator devices as well as a method of retrofitting such vortex generator devices onto the surface of a wind turbine blade.

Normally, when installing vortex generator (VG) devices, such as VG strips, on a wind turbine blade, a recess is milled or otherwise cut into the blade, wherein the base plate of the vortex generator strip is inserted so that the top surface of the base plate is substantially flush with the surface of the blade. Accordingly, the base plate of the strip does not protrude from the surface of the blade, whereby the risk of the strip being ripped loose during normal use of the wind turbine blade is reduced. Further, the risk of the base plate contributing undesired effects to the flow or causing noise is reduced. However, the attachment method is tedious and for structural reasons it may be undesirable to mill a recess into the surface of the blade. Accordingly, in many aspects, it is desirable to mount the vortex generator strip directly on the surface of the wind turbine blade.

WO2007/140771 describes a solution where a vortex generator strip is mounted directly on the surface of a wind turbine blade, e.g. by use of an adhesive film or strip. A joint area of the vortex generator strip is completely or partially covered by sealing means in order to prevent the vortex generator strip from being ripped off the blade during use. In the document a joint area is defined as the area where the perimeter of the strip meets the surface and where a more or less visible gap between the strip and the blade surface and the surroundings is formed. It is recognised that this solution involves an additional step of sealing the perimeter of the vortex generator strip after the strip has been mounted on the surface of the blade. It is desirable to omit this step when retrofitting vortex generator devices to the surface of the wind turbine blade.

It is an object of the invention to obtain a vortex generator device and a new wind turbine blade, which overcome or ameliorate at least one of the disadvantages of the prior art or which provides a useful alternative.

According to a first aspect, the invention provides a vortex generator device, where the inner side of the base is provided with a recess or undercut for containing an adhesive.

Thereby, the adhesive, e.g. in form of an adhesive tape or strip, may be inserted into the recess or undercut so that the surrounding parts of the inner side of the base protects the adhesive, once the vortex generator device is mounted on the surface of a wind turbine blade, since the surrounding parts may contact the blade. Accordingly, there is no need for subsequently sealing the edges of the base of the vortex generator strip.

In one embodiment, the adhesive film or strip comprises a layer of compressible material, such as a layer of foamed polymer or foam cells. Thereby, the adhesive film, strip or layer is better adapted to conform to the surface of the wind turbine blade.

According to an advantageous embodiment, an adhesive film or strip, such a double adhesive tape, is arranged within the recess of the inner side. This provides a particular simple solution, where the adhesive may be pre-applied to the vortex generator device.

Advantageously, the adhesive film or strip is covered by a peel-off layer. Thereby, the adhesive film or strip may be protected in order to maintain the adhesion of the film or strip until the device is mounted on a wind turbine blade.

In one advantageous embodiment, the adhesive is acrylic based. The adhesive may for instance be pressure sensitive, thereby providing a simple solution when fitting the vortex generator device to the surface of a wind turbine blade, as the worker only has to apply pressure to the base of the vortex generator device.

In another advantageous embodiment, the vortex generating means protrude from the outer side of the base. The vortex generating means may for instance be vane vortex generators, i.e. fins protruding from the outer side.

In yet another advantageous embodiment, the base comprises a first perimeter and wherein the recess comprises a second perimeter, the second perimeter having a spacing to the first perimeter. Thereby a small wall surrounds the entire recess, thus protecting the adhesive in the recess. The first perimeter may be substantially parallel to the second perimeter.

The base may typically be formed so as to comprise a first end and a second end, and a first side and a second side, e.g. as an elongated strip. The first side may advantageously be substantially parallel to the second side.

In a first embodiment, the first end is substantially parallel to the second end. In a second embodiment, the first end is non-parallel to the second end so that the first side is longer than the second side. Accordingly, the base may be substantially trapezium-shaped.

In one advantageous embodiment, a single vane vortex generator pair having a first vane and a second vane protrudes from the outer side. The first vane may be oriented substantially parallel to the first end of the base, and the second vane may be oriented substantially parallel to the second end of the base. Thus, the invention provides a vane vortex generator pair, which is mutually prearranged, but where the surface area of the base is decreased compared to the prior art, thus obstructing the free flow across the wind turbine blade as little as possible.

In another advantageous embodiment, the first vane and the second vane are oriented so that they form a mutual angle of 10 to 70 degrees, or 15 to 60 degrees, or 20 to 50 degrees. Accordingly, the first end and the second end of the base may form an angle of a corresponding size.

In one advantageous embodiment, a height of the first vane and/or the second vane increases from the second side towards the first side, at least along a part of said vanes. The shape of the first vane and/or the second vane may for instance be substantially triangular or wedge-shaped. However, the shape may deviate from this form by for instance having a somewhat flattened top, and the derivative of the height may for instance be increasing or decreasing from the second side towards the first side. However, in general, the vane will have a minimum height at the second side (or equivalently a leading edge side) and its maximum height near the first side (or equivalently a trailing edge side) of the base. The vane(s) may be formed integrally with the base. Alternatively, the base and vanes may be manufactured as separate parts which are subsequently coupled or adhered to each other.

A perimeter or rim of the base may be tapered or rounded in order to obtain a gradual transition to the surface of the wind turbine blade. The vortex generator device may be made of wood, aluminium or stainless steel. However, according to an advantageous embodiment, the vortex generator is made of a polymer material such as TPU, PBT, PET or LDPE. The vortex generator device may also be made of polycarbonate (PC) or at combination of PBT and PC.

Additional sealant may of course in principle be added to the rim of the base. However, the recess or undercut removes this necessity.

The base of elongated strips comprising a plurality of vortex generator means may be straight or curved, e.g. zigzag shaped.

According to a second aspect, the invention provides a kit of parts comprising vortex generators devices according to any of the aforementioned embodiments and being of different sizes, e.g. two or three sizes. The kit of parts may for instance comprise vortex generators having two different heights, one set of vortex generator having a first height, and a second set of vortex generators having a second height. The second height may approximately be a factor 1.5 or 2 of the first height. Similarly, the kit of parts may comprise a third set of vortex generators having a third height. The third height may approximately be a factor 3 of the first height.

In an advantageous embodiment, the inner side of the base is concave between the first side and the second side. Thus, the vortex generator device is adapted to conform to a curved surface, such as the surface of a wind turbine blade. The entire base, i.e. both the inner side and the outer side, may of course be curved, but the two sides need not have the same curvature. The curvature may be set as an average of the curvature of blade sections, for which the devices are intended so as to be pre-curved to fit to a large number of different blades and/or blade sections. The adhesive film or strip comprises a layer of compressible material may be used for compensating for variations so as to exactly fit to the curvature of the blade.

According to one advantageous embodiment, the vane further comprises a trailing edge portion located nearest the trailing edge side of the vane, which is tapered towards the trailing edge side of the vane, and/or the vane is tapered towards a top part of the vane.

Thus, it is clear that the vane has a trailing edge part, in which the height of the vane decreases towards the trailing edge side, and/or that the thickness of the vane, i.e. the distance between a first side and a second side of the vane, decreases towards a top portion of the vane. Thereby, it is possible to manufacture the vortex generator device by moulding and ensuring that the moulded vortex generator device may be released from the mould without parts of the vortex generator device breaking apart. At the same time, the functionality of the vortex generator device is not impaired compared to conventional vortex generator devices having a triangular shaped vane with a non-tapered trailing edge and non-tapered thickness.

Accordingly, the vortex generator device may according to an advantageous embodiment be moulded.

According to an advantageous embodiment, the vortex generator device is made of a metal, such as aluminium or stainless steel, or a polymer material, such as TPU, PBT, PET or LDPE, polycarbonate (PC), or a combination of PBT and PC.

According to another advantageous embodiment, the trailing edge portion forms an average trailing edge tapering angle to a surface normal to the base in an interval between 1 and 20 degrees, or between 1 and 15 degrees, or between 1 and 10 degrees. Advantageously, the average trailing edge tapering angle is between 4 and 8 degrees, e.g. around 6 degrees. Of course, the trailing edge portion should also form the same angle to a surface normal to the wind turbine blade, when mounted on a surface of the wind turbine blade. The term "average angle" is used, since the trailing edge portion may be slightly curved.

According to one embodiment, the trailing edge portion is substantially straight. Thus, the entire trailing edge part is tapered with a tapering angle that forms the trailing edge tapering angle to a surface normal.

According to another advantageous embodiment, sides of the vane form a thickness-tapering angle between 0.5 and 5 degrees, or between 0.5 and 3.5 degrees, or between 0.5 and 2 degrees. Thus, the vane is substantially tapered towards a top portion of the vane.

In yet another advantageously embodiment, the first vane and the second vane are tilted towards each other, each forming a tilt angle to a surface normal being between 0.5 and 3 degrees. Thus, the first vane and the second vane are slightly inclined towards each other.

Advantageously, the leading edge portion extends along at least 50%, or at least 60%, or at least 70%, or at least 75% of a total length of the vane. The leading edge portion may even extend along at least 80% or 85% of the total length of the vane.

According to another advantageous embodiment, the vane, i.e. the first vane and/or the second vane, comprises a flattened top portion. The vane may for instance have an intermediate portion, where the height of the vane is substantially constant. However, this part may also be slightly rounded or the like.

According to a third aspect, the invention provides a blade for a rotor of a wind turbine having a substantially horizontal rotor shaft, said rotor comprising a hub, from which the blade extends substantially in a radial direction when mounted to the hub, the blade having a longitudinal direction with a tip end and a root end and a transverse direction, the blade further comprising a profiled contour including a pressure side and a suction side as well as a leading edge and a trailing edge with a chord having a chord length extending therebetween, the profiled contour, when being impacted by an incident airflow, generating a lift, wherein the profiled contour is divided into a root region having a substantially circular or elliptical profile closest to the hub, an airfoil region having a lift-generating profile furthest away from the hub, and optionally a transition region between the root region and the airfoil region, the transition region having a profile gradually changing in the radial direction from the circular or elliptical profile of the root region to the lift-generating profile of the airfoil region, and wherein the blade is provided with a vortex generator according to any of the aforementioned embodiments, and wherein the inner side of the base of the vortex generator is attached to a surface of the wind turbine blade.

Thus, the outer side and the vortex generating means extend or protrude from the surface of the wind turbine blade.

Typically, a shoulder having a shoulder width is located at the boundary between the transition region and the airfoil region.

Advantageously, the base of the vortex generator extends substantially in the longitudinal direction of the blade. Alternatively, the base may be angled or curved relative to the longitudinal direction or a pitch axis of the blade. However, the vortex generator is arranged along at least a longitudinal extent of the blade, e.g. along at least 10%, 15%, 20% or 25% of the length of the blade.

Accordingly, the vortex generator is advantageously arranged with the first end of the base nearest the root and a second end nearest the tip of the blade.

In one advantageous embodiment, the second side of the base is located nearest the leading edge of the blade.

Advantageously, the vortex generators are arranged in the airfoil region of the blade, preferably on the suction side of the blade. In another embodiment, the vortex generators are arranged in the root region and/or the transition region. The vortex generators may also be arranged so that they extend from a part of the root region over the transition region and to a part of the transition region.

In one embodiment, the vortex generators are arranged in an outboard section of the blade, i.e. a longitudinal section of the blade nearest the tip.

In another advantageous embodiment, the vortex generator is arranged at a chordal position in an interval of 5-85%, or 10-75%, or 15-60% of the chord length, seen from the leading edge of the blade.

In yet another embodiment, the airfoil region is divided into a first longitudinal section nearest the root, and second longitudinal section nearest the tip, wherein the first longitudinal section comprises vortex generators having a first height, and the second longitudinal section comprises vortex generators having a second height, and wherein the first height is larger than the second height. The airfoil may of course also have a third longitudinal section comprising vortex generators having a third height. In general, the height of the vortex generators should be decreasing towards the tip end of the blade, since the relative thickness and absolute thickness of the blade typically is decreasing towards the tip end. The aforementioned kit of parts may be used for these regions.

According to a fourth aspect, the invention provides a wind turbine comprising a number of blades, preferably two or three, according to any of the aforementioned embodiments.

According to a fifth aspect, the invention provides a method of retrofitting a vortex generator device according to any of the aforementioned embodiments to a surface of a wind turbine blade.

The invention is explained in detail below with reference to an embodiment shown in the drawings, in which.

Figure 1:
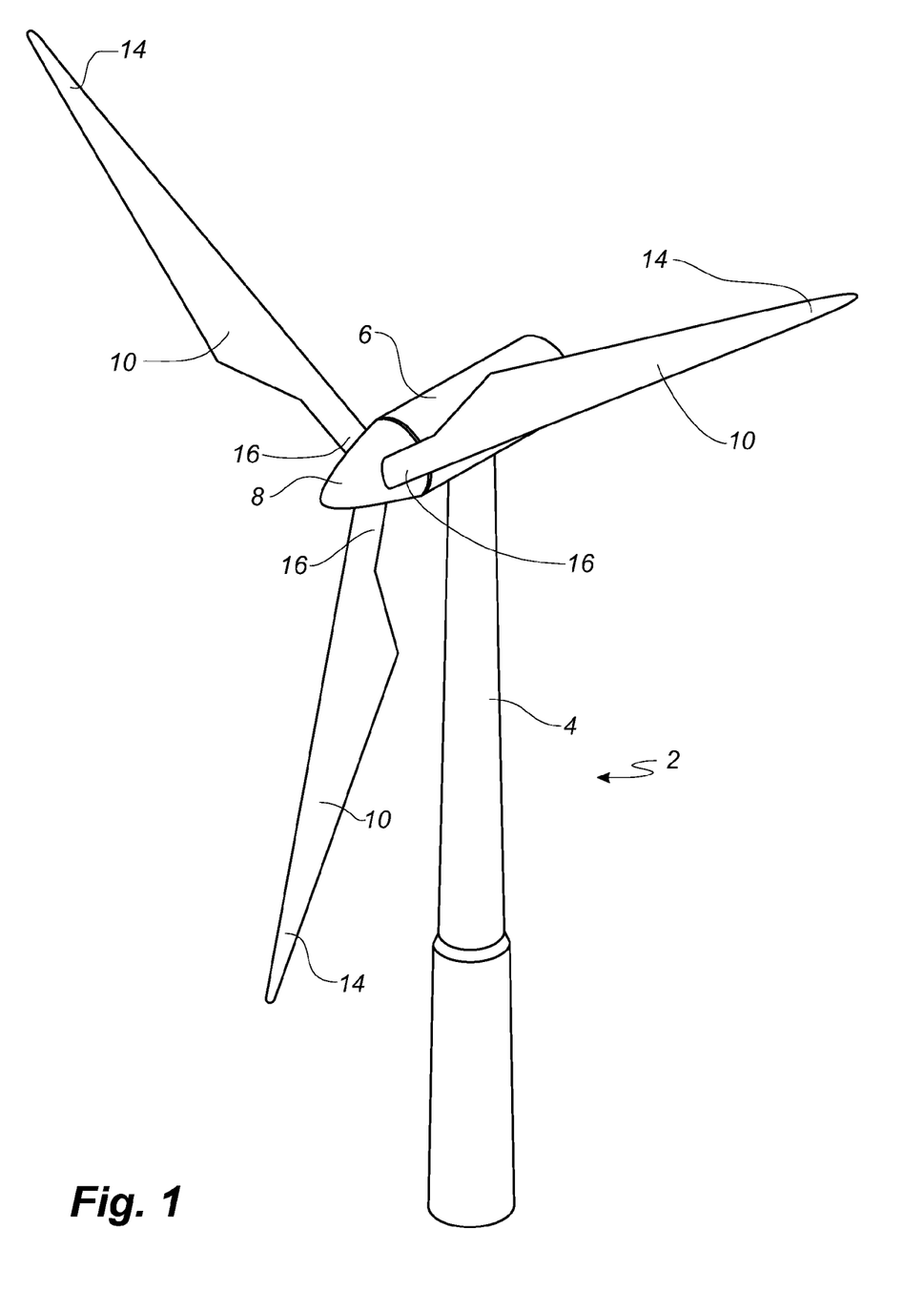
FIG. 1 shows a schematic view of a wind turbine.

FIG. 1 illustrates a conventional modern upwind wind turbine according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 furthest from the hub 8. The rotor has a radius denoted R.

Figure 2:
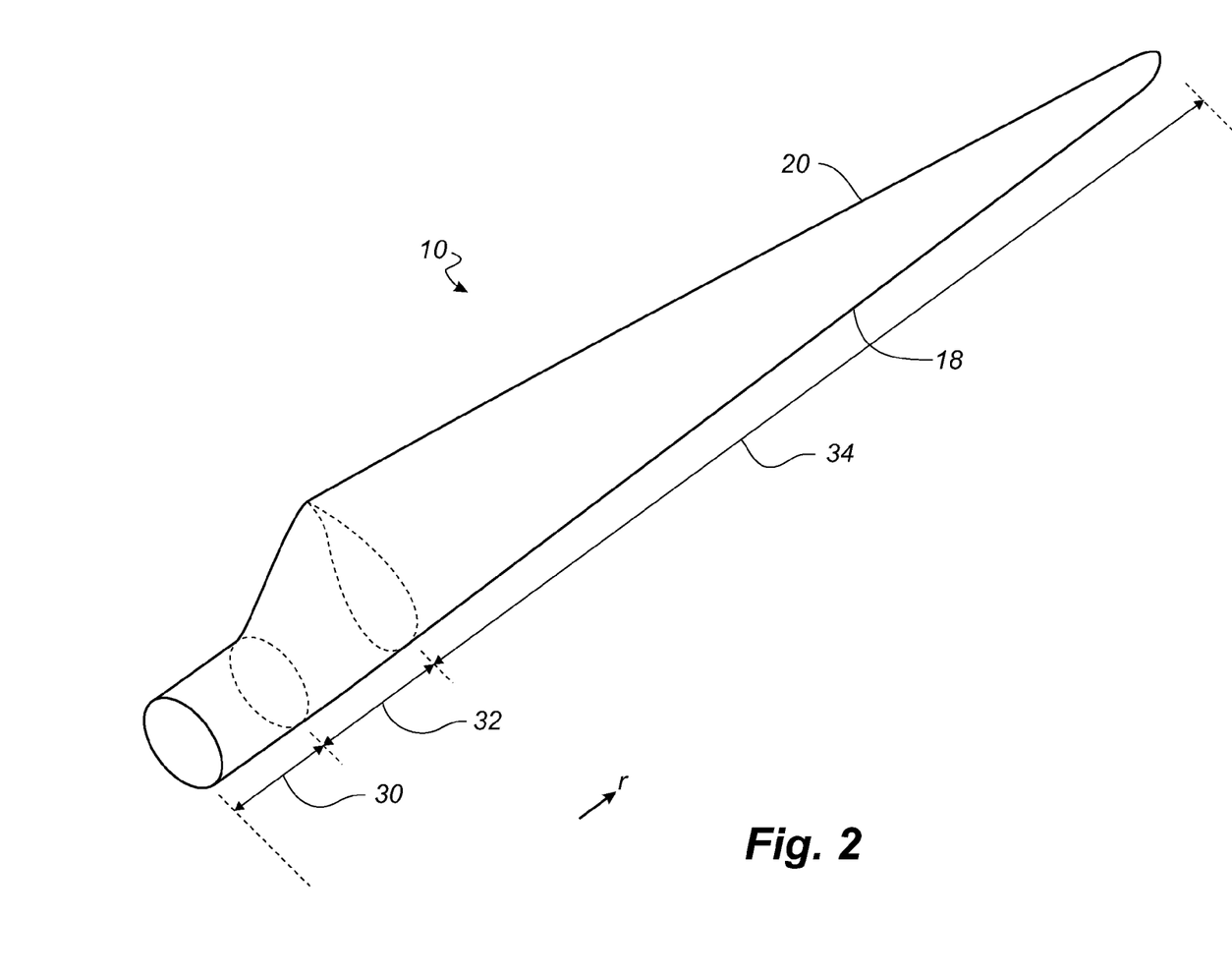
FIG. 2 shows a schematic view of a wind turbine blade.

FIG. 2 shows a schematic view of a first embodiment of a wind turbine blade 10 according to the invention. The wind turbine blade 10 has the shape of a conventional wind turbine blade and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 is typically constant along the entire root area 30. The transition region 32 has a transitional profile 42 gradually changing from the circular or elliptical shape 40 of the root region 30 to the airfoil profile 50 of the airfoil region 34. The chord length of the transition region 32 typically increases substantially linearly with increasing distance r from the hub.

The airfoil region 34 has an airfoil profile 50 with a chord extending between the leading edge 18 and the trailing edge 20 of the blade 10. The width of the chord decreases with increasing distance r from the hub.

It should be noted that the chords of different sections of the blade normally do not lie in a common plane, since the blade may be twisted and/or curved (i.e. pre-bent), thus providing the chord plane with a correspondingly twisted and/or curved course, this most often being the case in order to compensate for the local velocity of the blade being dependent on the radius from the hub.

Figures 3, 4, 5:
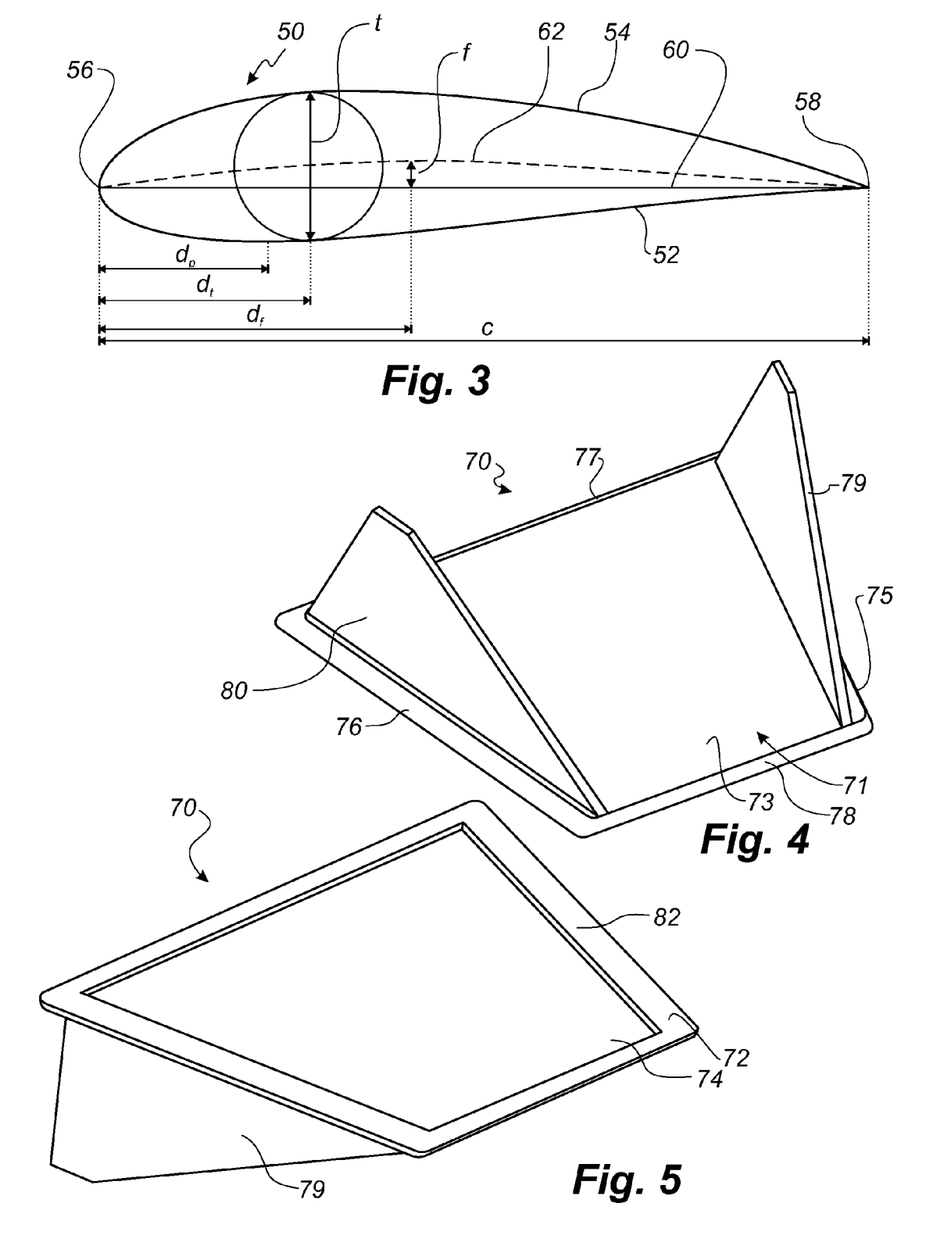
FIG. 3 shows a schematic view of an airfoil profile.
FIG. 4 shows a schematic top view of a vortex generator device according to the invention.
FIG. 5 shows a schematic bottom view of the vortex generator device according to the invention.

FIG. 3 shows a schematic view of an airfoil profile 50 of a typical blade of a wind turbine depicted with the various parameters, which are typically used to define the geometrical shape of an airfoil. The airfoil profile 50 has a pressure side 52 and a suction side 54, which during use—i.e. during rotation of the rotor—normally faces towards the windward (or upwind) side and the leeward (or downwind) side, respectively. The airfoil 50 has a chord 60 with a chord length c extending between a leading edge 56 and a trailing edge 58 of the blade. The airfoil 50 has a thickness t, which is defined as the distance between the pressure side 52 and the suction side 54. The thickness t of the airfoil varies along the chord 60. The deviation from a symmetrical profile is given by a camber line 62, which is a median line through the airfoil profile 50. The median line can be found by drawing inscribed circles from the leading edge 56 to the trailing edge 58. The median line follows the centres of these inscribed circles and the deviation or distance from the chord 60 is called the camber f. The asymmetry can also be defined by use of parameters called the upper camber (or suction side camber) and lower camber (or pressure side camber), which are defined as the distances from the chord 60 and the suction side 54 and pressure side 52, respectively.

Airfoil profiles are often characterised by the following parameters: the chord length c, the maximum camber f, the position $d_f$ of the maximum camber f, the maximum airfoil thickness t, which is the largest diameter of the inscribed circles along the median camber line 62, the position $d_t$ of the maximum thickness t, and a nose radius (not shown). These parameters are typically defined as ratios to the chord length c. Thus, a local relative blade thickness t/c is given as the ratio between the local maximum thickness t and the local chord length c. Further, the position $d_p$ of the maximum pressure side camber may be used as a design parameter, and of course also the position of the maximum suction side camber.

Figure 6:
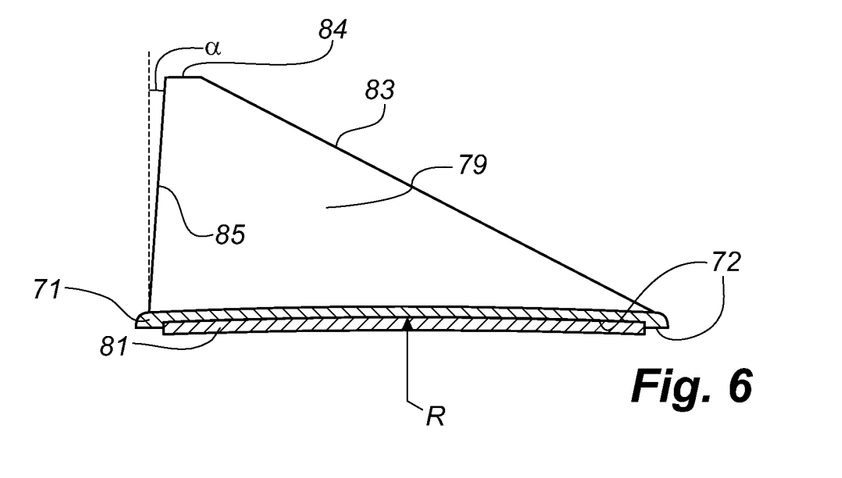
FIG. 6 shows a cross section of the vortex generator device according to the invention.
Figure 7:
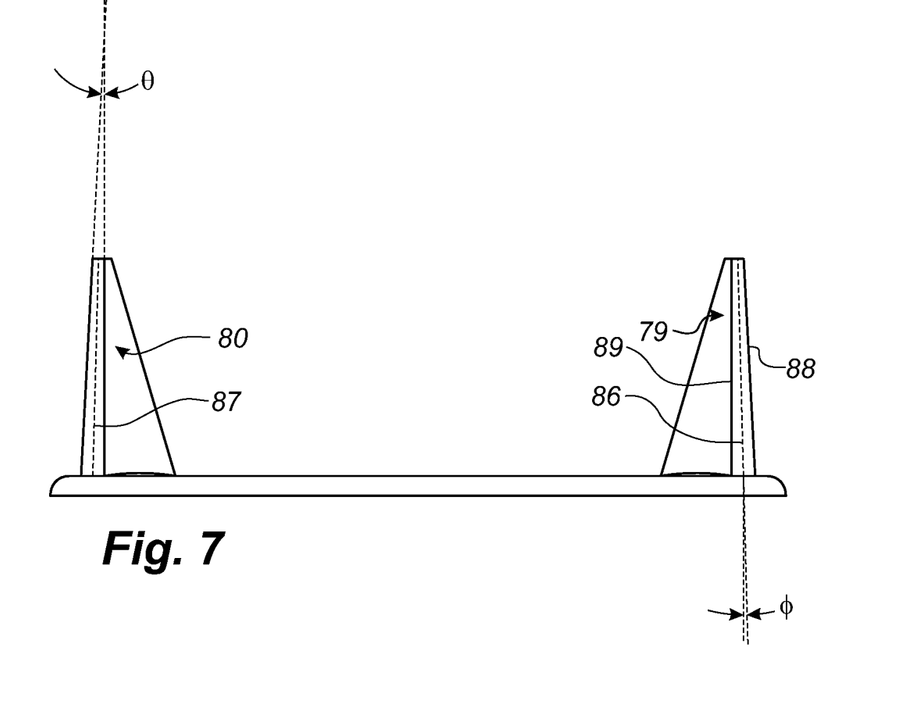
FIG. 7 shows another side view of the vortex generator device according to the invention.

FIGS. 4-7 show different views of a vortex generator (VG) device 70 according to the present invention, where FIGS. 4 and 5 show two perspective views, FIG. 6 shows a cross-section of the VG device 70, and FIG. 7 shows a side view seen from a trailing edge side of the vortex generator device.

As seen in FIG. 4, in an advantageous embodiment the vortex generator device 70 is formed as a vane VG device comprising a base 71 having (when mounted to an exterior of the wind turbine blade), an inner side 72 for attaching to the exterior of the wind turbine blade, and an outer side 73 facing away from the exterior of the wind turbine blade. The base 71 further comprises a first side 77 (or trailing edge side) and a second side 78 (or leading edge side), as well as a first end 75 and a second end 76. The base 71 is trapezium-shaped so that the first side 77 is parallel to the second side 78 and so that a length of the second side 78 of the base 71 is smaller than a length of the first side 77 of the base 71. In an advantageous embodiment, the first end 75 and the second end 76 are oriented so that they form a mutual tapering angle of approximately 38 degrees. The base may advantageously be formed with a rounded perimeter as further shown in FIG. 6.

The VG device 70 comprises a vane pair comprising a first vane 79 and a second vane 80, also called fins, which protrude from the outer side 73 of the base 71. The first vane 79 is oriented at and parallel to the first side 75 of the base 71, and the second vane 80 is oriented at and parallel to the second side 76 of the base 71.

FIG. 5 shows a perspective view of the VG device 70, where the inner side 72 of the base 71 can be seen. The inner side 72 of the base 71 is provided with a recess 74 or undercut. The recess 74 has a perimeter, which is parallel to a perimeter of the base 71. Thus, the perimeter of the recess 74 is also trapezium-shaped with sides, which are parallel to the first end 75, second end 76, first side 77 and second side 78 of the base. The recess 74 is thus surrounded by a surround wall 82. The surrounding wall 82 is adapted to protect an adhesive arranged within the recess 74 so that the VG device 70, when mounted on the exterior of the wind turbine blade, does not become ripped loose from the exterior of the wind turbine blade.

FIG. 6 shows a cross-section of the VG device 70, wherein the first vane 79 can be seen. The VG device is depicted with an adhesive strip 81 or tape arranged within the recess 74. It can be seen that the base 71 is curved so that the inner side 72 of the base 71 is concave between the first side 77 and the second side 78 of the base 71 and has a curvature radius R. The curvature radius is chosen as an average of the curvature of blade sections, for which the particular VG device 70 is intended so as to be pre-curved to fit to a large number of different blades and/or blade sections. Advantageously, the adhesive strip 81 comprises at least an adhesive outer layer for mounting on the exterior of the wind turbine blade and a layer of compressible material, such as a layer of foamed polymer or foam cells. The adhesive strip 81 is thus adapted for compensating for variations so as to exactly fit or conform to the curvature of exterior of the blade. The curvature of the inner side 72 of the base 71 and the outer side 73 of the base 71 need not be the same.

Further, FIG. 6 shows the shape of the vanes. It can be seen that the vanes comprises a leading edge portion 83, wherein a height of the vane increases from the second side 78 towards the first side 77 of the base 71, an intermediate portion or top portion 84, wherein a height of the vane is substantially constant, and a trailing edge portion 85, wherein a height of the vane is decreasing towards the first side 77 of the base 71. In the depicted embodiment, the vane comprises a substantially straight trailing edge portion 85, i.e. so that the height of the vane linearly decreases along this portion. Thus, the trailing edge portion 85 is tapered so that the vane forms a trailing edge tapering angle α with a surface normal to a plane of the base 71 (and the exterior of the wind turbine blade). The trailing edge tapering angle α is advantageously around 6 degrees.

FIG. 7 shows a side view of the VG device seen from first side 77 of the base 71. It can be seen that the vanes are tapered so that first sides 88 and second sides 89 of the vanes are tapered towards a top portion of the vanes with a thickness-tapering angle θ. The thickness-tapering angle θ may for instance be between 1 and 2 degrees. Further, the first vane 79 and 80 may be inclined towards each other so that a first tilt axis 86 of the first vane 79 and a second tilt axis of the second vane 80 both form a tilt angle φ to a surface normal being between for instance between 0.5 and 1 degrees. However, the vanes 79, 80 may advantageously protrude perpendicularly from the base 71 (and the exterior of the wind turbine blade).

The VG device is provided with the thickness-tapering angle θ and the trailing edge tapering angle α, as well as the optional tilt angle φ so that the VG device 70 may be moulded in a single piece and still be released from the mould without parts of the VG device 70 braking off. At the same time, the function of the VG device 70 is not impaired compared to conventional VG devices. In an advantageous embodiment, the VG device is moulded as a unitary element made in a combination of PBT and polycarbonate.

The embodiment has here been shown as a single VG vane pair on a trapezium-shaped base. However, it is recognised that the VG device includes several inventive concepts, e.g. the use of the recess, the tapering and tilt angles so as to be able to mould the VG device, and the use of a trapezium-shaped base. Thus, it is recognised that other embodiments utilising these inventive concepts may be contemplated.

With respect to the moulded VG device, it is for instance not necessary that the device comprises exactly one VG vane pair. The moulded VG device may for instance instead be formed as a strip comprising a plurality of VG vane pairs, or be formed with only a single vane arranged on a foot.

This is also the case for the VG device with the recess on the inner side of the base, where it is recognised that the device may be formed as a strip comprising a plurality of VG pairs. Also, it is recognised that this idea may be used for other flow guiding devices with parts protruding from an outer side of the strip/base, such as spoilers, Gurney flaps or the like.

Figure 8A:
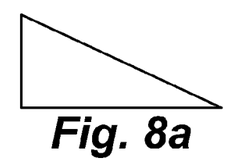
FIGS. 8*a-h* show different shapes of vanes for vortex generator devices according to the invention.
Figure 8B:
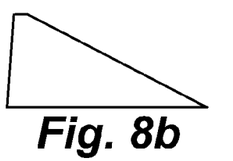
Figure 8C:
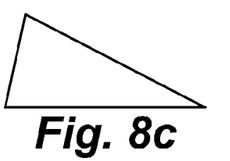
Figure 8D:
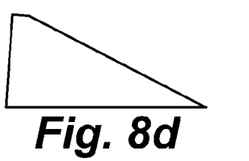
Figure 8E:
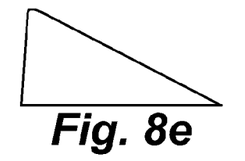
Figure 8F:
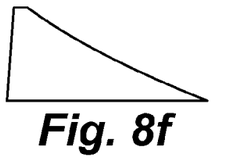
Figure 8G:
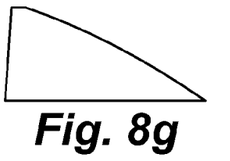
Figure 8H:
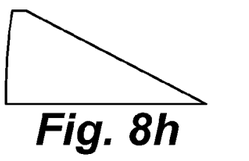

Further, it is recognised that the vane may have various shapes. Thus, the vane may for instance has a shape as a right triangle as shown in FIG. 8a, or it may comprise a tapered trailing edge part with a flattened top as shown in FIG. 8b or without a flattened top in FIG. 8c. The vane may also comprise an intermediate section having a different tapering angle as shown in FIG. 8d, or a rounded top portion as shown in FIG. 8e. The leading edge part of the vane may comprise a straight top part as shown in FIGS. 8a-e, or a concave top part as shown in FIG. 8f or a convex top part as shown in FIG. 8g. The trailing edge part may also be concave or convex as shown in FIG. 8h. Yet again the shape may take any combination of said sections shown in the embodiments of FIG. 8.

Figure 9:
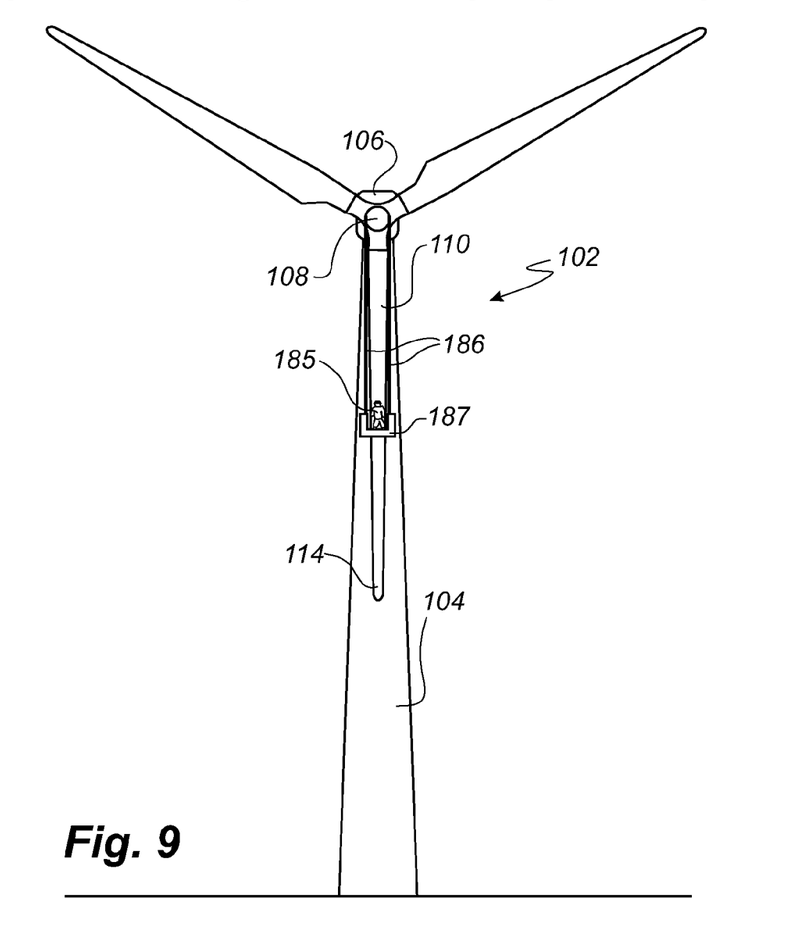
FIG. 9 shows a wind turbine blade being retrofitted with vortex generator devices according to the invention.

FIG. 9 illustrates a wind turbine 102 comprising a tower 104, a nacelle 106 and a rotor with a substantially horizontal rotor shaft. The rotor includes a hub 108 and three blades 110 extending radially from the hub 108. The rotor is stopped in a position, where one of the blades 110 is positioned substantially vertical with a tip end 114 pointing towards ground. Furthermore, the wind turbine blade 110 is pitched to a break position. A worker 185 is working on the wind turbine blade 110 and is hoisting down along the trailing edge of the blade 110 via a work platform 187 and a hoisting arrangement 186. The hoisting arrangement 186 comprises wires, which are connected (not shown) near the root of the wind turbine blade 110, e.g. to the hub 108 of the wind turbine 102.

According to other embodiments, the worker can use a cherry picker for getting access to the blade. Yet again, the worker may rappel down along the blade from a position above an area of application.

In the following, a method and tools according to the invention for retrofitting the VG devices 70 to the exterior of a wind turbine blade is explained with reference to FIG. 10-13.

Figures 10, 11:
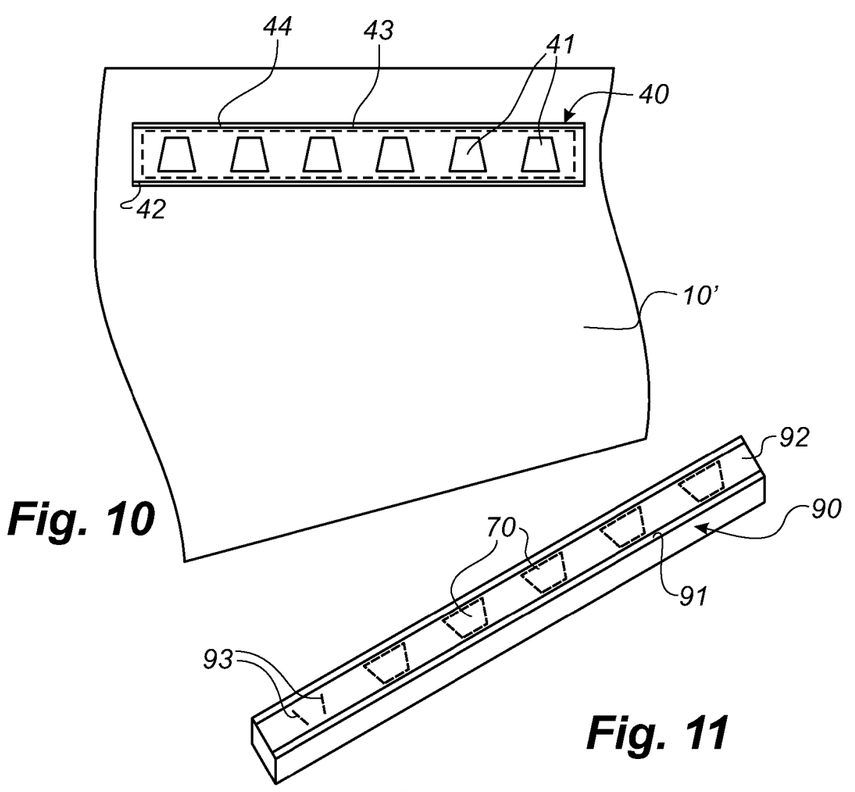
FIG. 10 shows a wind turbine blade section provided with a masking film according to the invention.
FIG. 11 shows a perspective view of a mounting plate according to the invention provided with vortex generator devices.

FIG. 10 shows a blade section 10', which is to be retrofitted with VG devices 70 according to the invention. In the shown embodiment, the VG devices 70 are to be arranged near a leading edge of the blade section 10'.

In a first embodiment, a masking film 40 is used for carefully aligning and arranging the VG devices 70 at a correct position on the blade section 10'. The masking film 40 comprises a number of openings 41, a peel-off layer 42 covering the openings 41, and an inner removal film. The retrofitting method begins with a worker applying a masking film 40 to the exterior of the blade section 10' at an area of application. Afterwards, the worker removes the peel-off layer 42, thus exposing the openings 41 of the masking film. Then the exterior of the blade is prepared for attaching the VG devices 70. This may be carried out by grinding, polishing, sanding or the like, and optionally cleaning the blade section afterwards. Due to the use of opening 41 corresponding to intended positions of the VG devices 70, it is possible to prepare only the areas, where the VG devices 70 are to be arranged or positioned. Thereby, the grinding, sanding or polishing of the surface will not inadvertently damage surrounding areas on the outer surface of the blade. Further, it is possible to inspect the surface of the blade prior to adhering the flow-altering devices to the surface of the blade in order ensure that the VG devices 70 will be arranged in the correct position.

After preparation of the exterior of the blade section 10', the inner removal film 43 is removed. Thus, it is ensured that the VG devices 70 will not inadvertently adhere to the masking film 40 instead of to the outer surface of the wind turbine blade. Further, the remaining part 44 of masking film 40 may function as a marker to indicate the correct area for applying a mounting plate 90, which is shown in FIG. 11.

The mounting plate 90 is made of for instance an open-celled foam or another foamed polymer. A number of VG devices 70 according to the invention are inserted into a first side 91 of the mounting plate in such a way that the vanes of the VG devices 70 are inserted into the mounting plate 90 and the inner side of the VG devices are exposed from the first side 91 of the mounting plate 90. The mounting plate 90 may be provided with cuts or slots 93, or be moulded with holes for inserting the vanes of the VG devices 70. However, the mounting plate may for instance also consist of two separate plate parts, which are assembled so as to fit around the vanes of the VG devices 70.

Figure 12:
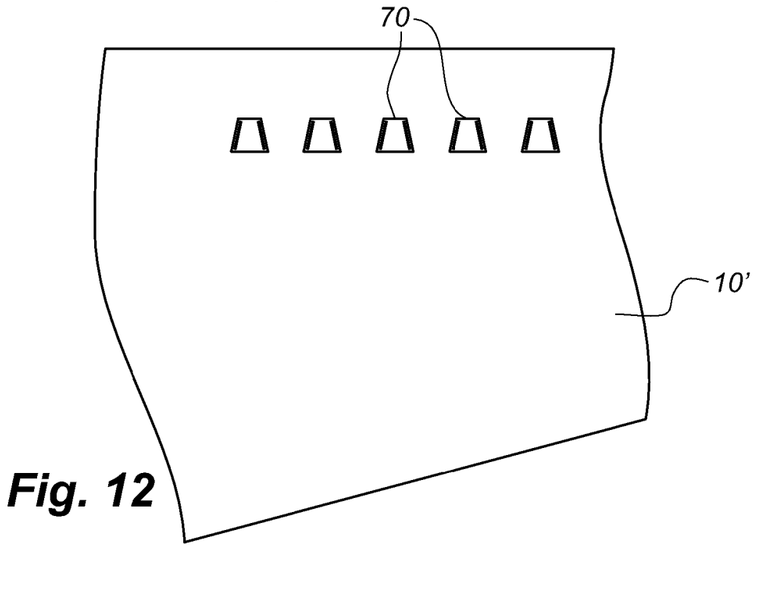
FIG. 12 shows the wind turbine blade section after vortex generator devices have been fitted to the surface of the wind turbine blade.
Figure 13:
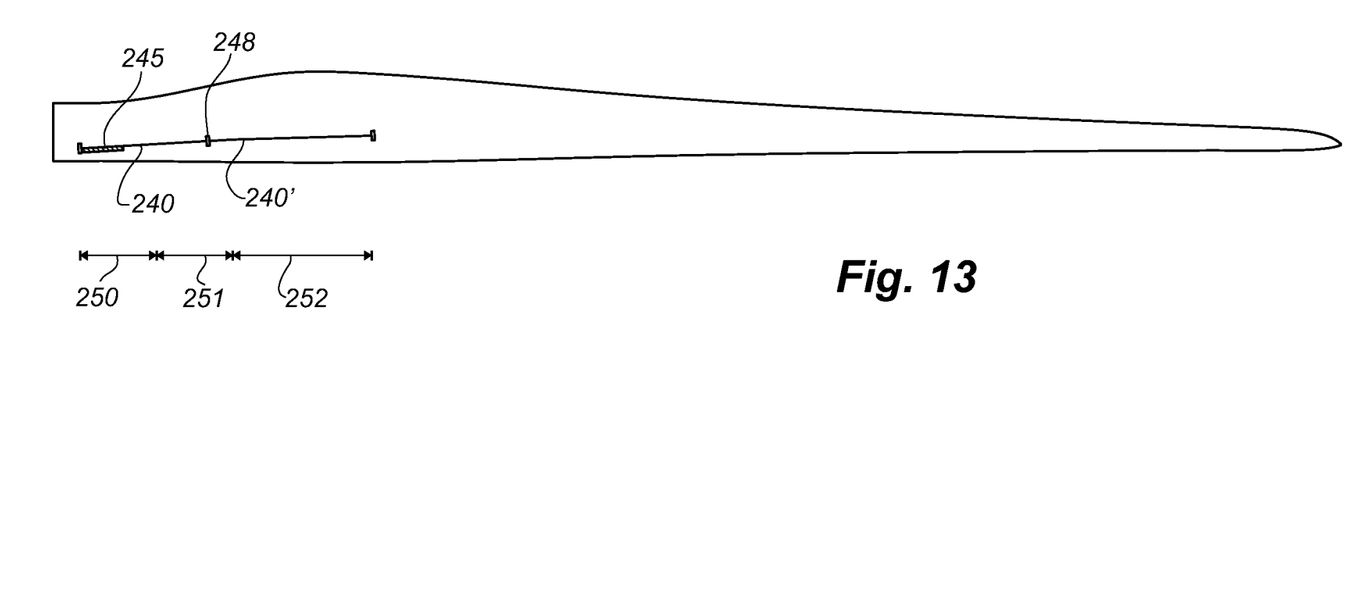
FIG. 13 shows the use of alignment strings.

The mounting plate 90 further comprises a peel-off layer 92, which is removed prior to retrofitting the VG devices 70 to the exterior of the blade section 10'. The VG devices 70 are then adhered with the inner side of the VG devices 70 to the exterior of the blade section 10' by applying the first side 91 of the mounting plate 90 onto the area of application on the exterior of the blade section 10', after which the mounting plate 90 is removed, thus—as shown in FIG. 12—leaving the VG devices 70 on the exterior of the blade section 10' due to the use of the adhesive strips in the recesses of the VG devices 70. The VG devices 70 may simply be adhered to the exterior of the blade section 10' by applying pressure to the mounting plate 90.

Additional VG devices 70 may be adhered to the exterior of the blade by repeating the above steps. In an advantageous embodiment, outermost cuts or holes 93 of the mounting plate for inserting a VG device 70 may be left void as shown in FIG. 11. Thereby, these slots 93 may be inserted over one of the already retrofitted VG devices. Thus, the spacing between an outermost already retrofitted VG device and an adjacent later retrofitted VG device may be preset. Thus, a simple method of retrofitting additional VG devices in direct extension of already retrofitted VG devices is provided.

In practice it may be difficult to apply the masking film 40 to the exterior of the blade section 10', in particular if the VG devices 70 are to be retrofitted in situ of a wind turbine, since the film may be difficult to control due to wind gusts and the like. Therefore, according to another embodiment shown in FIG. 13, a simple setup using mounting reference string(s) 240, 240' may be utilised instead. The mounting reference strings 240, 240' may be aligned with predetermined positions on the exterior of the blade so as to flush with an area of application 245 for adhering of the VG devices. The mounting reference strings 240, 240' may for applied to the surface of the blade by use of tape 248. The VG devices 70 are then adhered to the exterior of the blade in a similar manner as in the previously described embodiment.

The blade may comprise a first longitudinal section 250 nearest the root of the blade, a third longitudinal section 252 nearest the tip of the blade, and an intermediate second longitudinal section 251 between the first longitudinal section 250 and the third longitudinal section 252. The three longitudinal sections 250, 251, 252 may be provided with VG devices of different sizes. In the embodiment depicted in FIG. 13, the three longitudinal sections 250, 251, 252 extend along a part of the root section of the blade, the transition region of the blade and an innermost part of the airfoil section. However, it is readily recognised that the longitudinal sections comprising different VG devices may be located differently and that the extent of the longitudinal sections will vary from blade type to blade type. It is also possible to use only two longitudinal sections and thus only two types of VG devices. Yet again, it may be possible to use four, or even five longitudinal sections and a corresponding number of different VG devices.

In practice, it has shown to be sufficient to use only three different types of VG devices for retrofitting in order to cover a number of different blade sections and blade types, viz.:

| Type | Total height | Height of base | Recess height | Curvature R |
|---|---|---|---|---|
| VG 10 | 10 mm | 1.3 mm | 0.35 mm | 500 mm |
| VG 20 | 20 mm | 2.0 mm | 0.8 mm | 1001 mm |
| VG 30 | 30 mm | 2.0 mm | 0.8 mm | 1501 mm |

The invention claimed is:

1. A vortex generator device (70) for mounting on a wind turbine blade (10) comprising:

a base (71) having, when mounted on an exterior of the wind turbine blade (10),
an inner side (72) for attaching on a surface, such as the exterior of the wind turbine blade (10), and
an outer side (73) facing away from the exterior of the wind turbine blade (10),
the device being provided with a vane vortex generator pair comprising a first vane (79) and a second vane (80) protruding from the outer side (73) of the base (71), characterised in that
the inner side (72) of the base (71) is provided with a recess (74) or undercut, the recess or undercut having a uniform depth;
wherein an adhesive film or strip is arranged within the recess of the inner side; and
wherein the adhesive film or strip comprises a layer of compressible material.

2. A vortex generator according to claim 1, wherein the adhesive film or strip, such as is a double adhesive tape, is arranged within the recess of the inner side.

3. A vortex generator device according to claim 1, wherein the adhesive film or strip comprises a layer of compressible material, such as is a layer of foam cells.

4. A vortex generator device according to claim 1, wherein the adhesive film or strip is covered by a peel-off layer.

5. A vortex generator device according to claim 1, wherein the adhesive is acrylic based.

6. A vortex generator device according to claim 1, wherein the vortex-generating means protrude from the outer side of the base, the vortex-generating means advantageously being vane vortex generators.

7. A vortex generator device according to claim 1, wherein the base comprises a first perimeter and wherein the recess comprises a second perimeter, the second perimeter having a spacing to the first perimeter.

8. A vortex generator device according to claim 7, wherein the first perimeter is substantially parallel to the second perimeter.

9. A vortex generator device according to claim 1, wherein the base further comprises:
a first end and a second end, and
a first side and a second side.

10. A vortex generator device according to claim 9, wherein the first side is substantially parallel to the second side, and/or the first end is substantially parallel to the second end.

11. A vortex generator device according to claim 1, wherein a single vane vortex generator pair having a first vane and a second vane protrudes from the outer side of the base.

12. A kit of parts comprising vortex generators devices according to claim 1 and being of different sizes, e.g. two or three sizes.

13. A blade (10) for a rotor of a wind turbine (2) having a substantially horizontal rotor shaft, said rotor comprising a hub (8), from which the blade (10) extends substantially in a radial direction when mounted to the hub (8), the blade having a longitudinal direction (r) with a tip end (16) and a root end (14) and a transverse direction, the blade further comprising:
a profiled contour (40, 42, 50) including a pressure side and a suction side as well as a leading edge (18) and a trailing edge (20) with a chord having a chord length extending therebetween, the profiled contour, when being impacted by an incident airflow, generating a lift, wherein the profiled contour is divided into:
a root region (30) having a substantially circular or elliptical profile closest to the hub,
an airfoil region (34) having a lift-generating profile furthest away from the hub, and optionally
a transition region (32) between the root region (30) and the airfoil region (34), the transition region (32) having a profile gradually changing in the radial direction from the circular or elliptical profile of the root region to the lift-generating profile of the airfoil region, and wherein the blade is provided with a vortex generator according to claim 1, and wherein the inner side of the base of the vortex generator is attached to a surface of the wind turbine blade.

14. A wind turbine comprising a number of blades, preferably two or three, according to claim 13.

15. A method of retrofitting a vortex generator device according to claim 1 to a surface of a wind turbine blade.

* * * * *